US010116599B2

(12) United States Patent
Wu et al.

(10) Patent No.: US 10,116,599 B2
(45) Date of Patent: Oct. 30, 2018

(54) TOPIC CATEGORIZED INSTANT MESSAGE COMMUNICATION

(71) Applicant: Cisco Technology, Inc., San Jose, CA (US)

(72) Inventors: Qiangsheng Wu, Shanghai (CN); Yong Yang, Shanghai (CN); Kaijun Pei, Shanghai (CN); Jiang Wu, Shanghai (CN); Katarina Lukacsy, Galway (IE)

(73) Assignee: Cisco Technology, Inc., San Jose, CA (US)

( * ) Notice: Subject to any disclaimer, the term of this patent is extended or adjusted under 35 U.S.C. 154(b) by 827 days.

(21) Appl. No.: 14/153,645

(22) Filed: Jan. 13, 2014

(65) Prior Publication Data

US 2015/0200879 A1   Jul. 16, 2015

(30) Foreign Application Priority Data

Dec. 11, 2013  (CN) .......................... 2013 1 0667179

(51) Int. Cl.
*G06F 3/00* (2006.01)
*G06F 3/048* (2013.01)
(Continued)

(52) U.S. Cl.
CPC .......... *H04L 51/046* (2013.01); *G06F 3/0483* (2013.01); *G06F 3/04842* (2013.01);
(Continued)

(58) Field of Classification Search
None
See application file for complete search history.

(56) References Cited

U.S. PATENT DOCUMENTS

| 5,859,974 A | * | 1/1999 | McArdle | ................. | G06Q 10/10 |
| | | | | | 709/204 |
| 6,393,460 B1 | * | 5/2002 | Gruen | .................. | G06Q 10/107 |
| | | | | | 709/204 |

(Continued)

FOREIGN PATENT DOCUMENTS

| EP | 2157747 B1 | 5/2012 |
| WO | 2005081664 A2 | 9/2005 |
| WO | 2008008800 A2 | 1/2008 |

OTHER PUBLICATIONS

Chat Features in Delphi Forums, Nov. 6, 2012, 4 pages.*

(Continued)

*Primary Examiner* — Yongjia Pan
(74) *Attorney, Agent, or Firm* — Edell, Shapiro & Finnan, LLC

(57) ABSTRACT

Techniques are presented for defining, for an online conference session, a plurality of pages, which may be preconfigured, based on information received from a moderating participant having administrative privileges for the conference session, each page corresponding to a discussion topic of a text-based conversation. A request is received from the moderating participant to select one of the plurality of pages. After a page has been selected, the selected page is synchronized such that the selected page is displayed to the moderating participant and each of the one or more other participants, and subsequent text-based communications are displayed in the display area of the selected page.

21 Claims, 14 Drawing Sheets

(51) Int. Cl.
*H04L 12/58* (2006.01)
*G06F 3/0483* (2013.01)
*G06F 3/0484* (2013.01)
*H04L 29/06* (2006.01)
*H04L 12/18* (2006.01)

(52) U.S. Cl.
CPC .......... *H04L 12/1822* (2013.01); *H04L 51/04* (2013.01); *H04L 65/4038* (2013.01)

(56) References Cited

U.S. PATENT DOCUMENTS

| | | | | |
|---|---|---|---|---|
| 6,557,027 | B1* | 4/2003 | Cragun | H04L 12/1813 709/204 |
| 6,564,244 | B1* | 5/2003 | Ito | H04L 12/1822 709/203 |
| 6,823,363 | B1* | 11/2004 | Noveck | H04L 12/1813 709/204 |
| 7,328,242 | B1 | 2/2008 | McCarthy et al. | |
| 7,383,307 | B2 | 6/2008 | Kirkland et al. | |
| 7,512,655 | B2* | 3/2009 | Armstrong | G06Q 10/10 709/205 |
| 7,660,899 | B2* | 2/2010 | Gavrilescu | G06F 17/30873 709/204 |
| 7,809,789 | B2* | 10/2010 | Shuster | A63F 13/12 345/473 |
| 7,856,469 | B2 | 12/2010 | Chen et al. | |
| 7,904,515 | B2 | 3/2011 | Ambati et al. | |
| 7,917,465 | B2 | 3/2011 | Ramamurthi | |
| 7,962,555 | B2* | 6/2011 | Sastry | G06F 17/30896 707/600 |
| 8,073,725 | B2 | 12/2011 | Loring et al. | |
| 8,171,087 | B2* | 5/2012 | Carrer | G06Q 10/00 709/205 |
| 8,190,999 | B2 | 5/2012 | Chen et al. | |
| 8,201,095 | B2* | 6/2012 | Dewar | G06F 17/30675 715/736 |
| 8,359,206 | B2* | 1/2013 | Whalin | G06Q 10/06 705/1.1 |
| 8,375,308 | B2* | 2/2013 | Fuchs | G06Q 10/107 715/751 |
| 8,473,553 | B2 | 6/2013 | McDevitt et al. | |
| 8,495,507 | B2 | 7/2013 | Schneider | |
| 8,793,324 | B1* | 7/2014 | Schabes | H04L 51/32 709/206 |
| 8,793,594 | B2* | 7/2014 | Jha | G06Q 10/1095 715/753 |
| 9,131,017 | B2* | 9/2015 | Kurupacheril | H04L 65/4023 |
| 9,185,134 | B1* | 11/2015 | Story, Jr. | G06Q 10/10 |
| 2005/0131714 | A1* | 6/2005 | Braunstein | G06Q 30/02 709/204 |
| 2005/0262199 | A1* | 11/2005 | Chen | G06Q 10/107 709/204 |
| 2008/0066001 | A1* | 3/2008 | Majors | G06Q 10/10 715/758 |
| 2008/0082609 | A1* | 4/2008 | O'Sullivan | G06Q 10/107 709/204 |
| 2009/0052645 | A1* | 2/2009 | Bansal | H04L 12/1827 379/202.01 |
| 2009/0094329 | A1* | 4/2009 | Ambati | G06Q 10/10 709/204 |
| 2009/0164912 | A1* | 6/2009 | Barber | G06Q 10/10 715/751 |
| 2009/0313334 | A1* | 12/2009 | Seacat | G06F 15/16 709/206 |
| 2009/0319917 | A1* | 12/2009 | Fuchs | G06Q 10/107 715/753 |
| 2011/0307788 | A1* | 12/2011 | Cheung | G06Q 10/10 715/731 |
| 2012/0005588 | A1* | 1/2012 | Bastide | G06Q 10/10 715/753 |
| 2012/0089928 | A1* | 4/2012 | Bryant | G06Q 10/10 715/753 |
| 2012/0317499 | A1* | 12/2012 | Shen | G06Q 10/107 715/752 |
| 2013/0031185 | A1* | 1/2013 | Wyatt | G06Q 10/107 709/206 |
| 2014/0108085 | A1* | 4/2014 | Henriksen | G06Q 10/109 705/7.19 |
| 2014/0214930 | A1* | 7/2014 | Hayman-Joyce | H04L 51/32 709/204 |
| 2015/0006298 | A1* | 1/2015 | Ross | G06Q 30/0269 705/14.66 |
| 2015/0033146 | A1* | 1/2015 | Wu | H04L 65/1096 715/753 |

OTHER PUBLICATIONS

Chat Tutorial #3—Customizing your Chatroom!, Aug. 13, 2012, 10 pages.*
deviantART Chat BETA 1.0, Aug. 13, 2006, 6 pages.*
Blackboard Collaborate Web Conferencing Essentials Guide for Moderators, Sep. 2011, 138 pages.*
Peter Saint-Andre, "XEP-0045: Multi-User Chat," XMPP Standards Foundation, Draft, Standards Track, Feb. 8, 2012, Chapters 1-12, pp. 1-84.

* cited by examiner

US 10,116,599 B2

TOPIC CATEGORIZED INSTANT MESSAGE COMMUNICATION

TECHNICAL FIELD

The present disclosure relates to instant message communication.

BACKGROUND

Instant Messaging (IM) tools typically display messages associated with a chat session in chronological order of entry. As multiple topics may be discussed during a single chat session, conversations may be difficult to follow as participants switch from one topic to another. This type of instant message communication is not suitable for most business purposes, as conversations may be disorganized due to lack of categorization of messages/lack of conversation threading. Further, transcripts of such conversations may be difficult to interpret and archive upon conclusion of a meeting during which a chat session occurs.

DESCRIPTION OF EXAMPLE EMBODIMENTS

Overview

Figure 1:
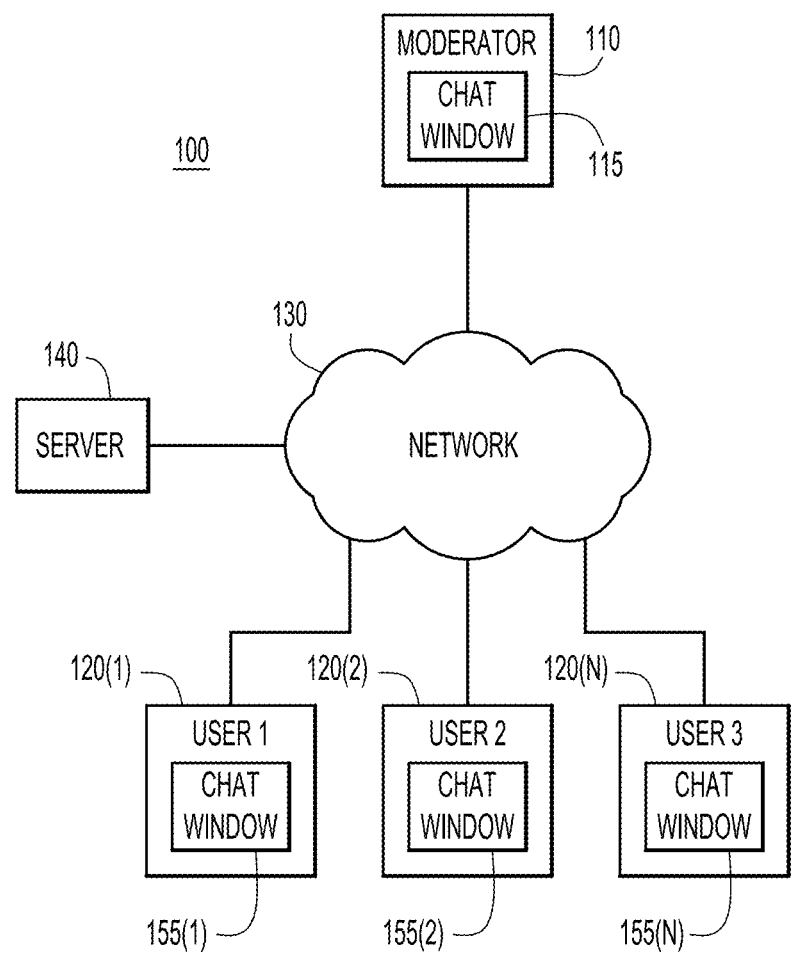
FIG. 1 is a block diagram of a system in which a multi-user chat session may be supported according to the techniques disclosed herein.

Presented herein are techniques for defining, for an online conference session, a plurality of pages, which may be preconfigured, based on information received from a moderating participant having administrative privileges for the conference session. Each page corresponds to a discussion topic of a text-based conversation. A request is received from a moderating participant to select one of the plurality of pages. After a page has been selected, the selected page is synchronized such that the selected page is displayed to the moderating participant and each of one or more other participants in the online conference session, and subsequent text-based communications are displayed in the display area of the selected page.

EXAMPLE EMBODIMENTS

In any venue with formal communications, discussion topics are usually determined prior to the initiation of a meeting. Once the meeting begins, additional topics may be dynamically derived from ongoing conversations. This is true when the discussion is conducted by way of text-based messages exchanged by Instant Messaging (IM) techniques. Therefore, the need arises to categorize messages not only based upon originally planned topics, but also, according to new topics arising as the meeting progresses. However, traditional instant messaging sessions are typically configured for a single topic, making it difficult to keep a chat session organized. For example, if a participant wishes to refer back to a previous portion of an instant messaging conversation to find specific information pertaining to a particular topic, locating such information can be difficult, especially if the IM session was lengthy or if messages were displayed in chronological order as part of a single conversation thread.

The techniques presented herein offer the ability to seamlessly and easily organize messages as part of an online multi-topic chat session, by establishing a specific page for each topic of the conversation. Each page may be accessed by selection of a tab corresponding to the page, with selection controlled by a moderator or other authorized participant of a meeting. Once a page is selected, subsequent messages from all participants (e.g., the moderator and other users) are displayed in chronological order on the page. Additionally, each participant may be granted access to all pages, that is, pages set up before an online communication session begins (preconfigured pages) and pages set up after an online communication session begins, with a single invitation. In other words, multiple rounds of invitations to each user are not needed or required in order to grant access to each page of the chat session. The techniques presented herein also allow new pages to be added dynamically during the conversation as the chat conversation progresses and additional topics are identified. This organization improves meeting productivity as well as enables post meeting review of conversation transcripts to be performed with greater ease. These techniques will be described more fully with reference to FIGS. 1-7 and the following description provided below.

FIG. 1 is a block diagram of a system 100 including one or more devices 110 and 120(1)-120(N) capable of sending information over a network 130 to be displayed in a chat window 115 and 155(1)-155(N) displayed on each device participating in a multi-topic group chat conversation. The device may be a computer terminal, Smartphone, tablet computer, or any other device having a display screen and capable of supporting text-based communications. One or more servers of a service provider, e.g., server 140, support the communication session in which the devices communicate.

A moderator device 110 may send a request to a server 140 over the network 130 to initiate and establish a group chat session with each remote device 120(1)-120(N). Each device 120(1)-120(N) also has a corresponding chat window 155(1)-155(N). Server 140 receives requests to create and maintain a plurality of pages, each page corresponding to a particular topic, and synchronizes the display of instant messages such that a message from any participant user device 120(1)-120(N) or moderator device 110, upon entry, is displayed in chat window 115 of the moderator device and in each chat window 155(1)-155(N) of each participant user device.

Server 140 accepts configuration changes from moderator device 110, or other device wherein a corresponding user has sufficient administrative privileges, such that addition of new topics or selection of a new topic during a conversation is permitted. Server 140 also synchronizes the chat window display of the moderator device 110 with each chat window display of each user.

Users associated with devices may have varying degrees of administrative privileges, e.g., a moderator may have full administrative privileges, while a user may have limited or no privileges. In addition, under certain circumstances, a user may be granted elevated privileges, providing the user with the capability to perform part or all of the functions performed by a moderator. For the purposes of this discussion, it is understood that administrative privileges are associated with a particular user, and not tied to a particular device per se. Although referred to as a 'moderating device' and a 'user device,' it is understood that these terms are used to signify that a user having administrative privileges is associated with a moderating device and a user without administrative privileges is associated with a user device.

Network 130 may include a local area network, wide area network (e.g., the Internet), wireless or hybrid network, that is capable of forwarding/routing messages between the moderator device 110, the one or more user devices 120(1)-120(N) and the server 140. Additional features of the multi-topic chat session are described in detail below.

Figure 2A:
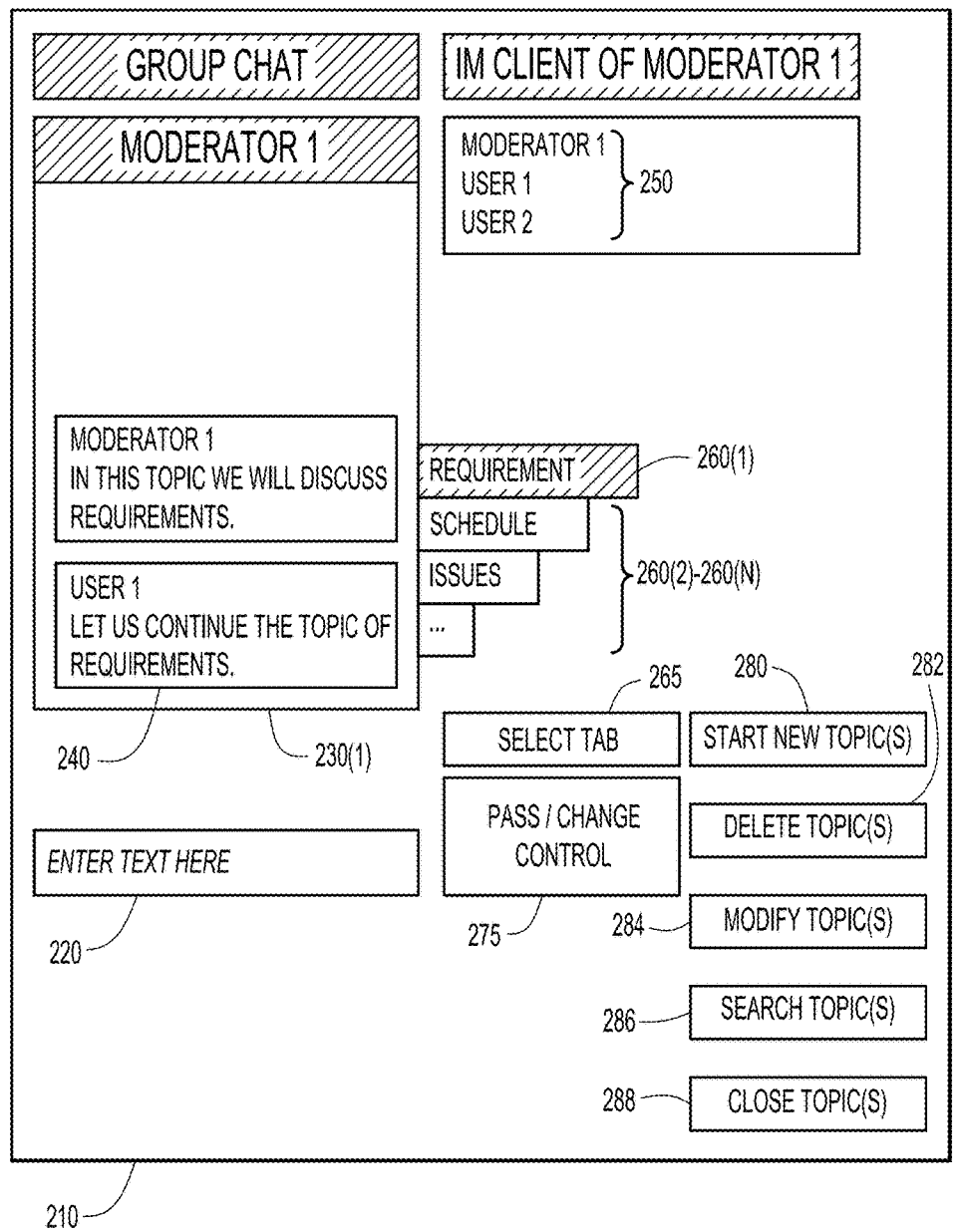
FIG. 2A is an illustration of an example of a chat window of a moderator, according to the techniques disclosed herein.

FIG. 2A shows an illustration of an example user interface screen for a chat window 210 that may be displayed on a device participating in a chat session, e.g., on a moderator device 110 or any of the devices 120(1)-120(N), wherein the user has moderator privileges. Chat window 210 comprises a message input area 220, one or more pages 230(1)-230(N) (only the selected page 230(1) is shown), one or more message(s) 240, a list of participants 250, an active tab 260(1), and one or more inactive tabs 260(2)-260(N). The active tab 260(1) is indicated by the shading to distinguish it from the inactive tabs 260(2)-260(N) which are not shaded. For simplicity, only one message, the message from user 1, has been labeled as message 240. It is readily apparent that messages from other participants (e.g., moderator 1) are also shown.

Additionally, the techniques presented herein provide for additional functionality, which may be accessed via a button/icon, drop-down menu, etc. that is accessible e.g., by right or left clicking a mouse button, or any other equivalent means. Such techniques are generally described below with reference to various commands, and it is expressly understood that the techniques presented herein are not tied to a particular graphical representation. For example, command 265 is used to switch the chat session from one page to another for all participants, as explained in additional detail below. Command 275, or other equivalent for passing control, may be provided to pass or change control of the chat session to another participant having suitable privileges. Additionally, a series of commands (e.g., issued with buttons, drop-down menus, icons, etc.) may be provided to manage conversation topics: command 280 may be used to add one or more new topics; command 282 may be used to delete one or more existing topics; and command 284 may be used to, e.g., rename one or more existing topics. Command 286 is used to search for a particular page of a chat session. Command 288 is used to close an existing page of a chat session.

With regard to inactive tabs, such as tab 260(2), the moderator may wish to view the contents of a page without selecting the page and propagating the selected page to all users. In order to do this, the moderator may simply click the desired tab to view its contents. Thus, the moderator is free to click back and forth between various tabs to view previously entered comments. Only by selecting the select tab command 265 or equivalent will this page be selected and synchronized to each participant of the chat session.

Additionally, while each user (e.g., non-moderator) would similarly be able to select a corresponding tab, in order to view previous discussions locally on a client machine, such users would not have the ability to select a new topic without being granted appropriate privileges, and therefore, all messages entered by a user would be directed to the page selected by the moderator.

Permission may be extended by a moderator to other users of the communication session, granting such users permission to add/modify/remove/close pages relating to designated topics. The moderator may extend such permissions in advance of meeting initiation or during an ongoing meeting, and may customize such permissions based upon the nature of the meeting and the type of participants.

Message input area 220 accepts text-based input, such as from a keyboard or other equivalent device (e.g., voice-to-text conversion). Upon entry, text-based input is displayed as a message on the selected page 230(1). One or more message(s) 240 may be displayed on the selected page. Only one page is active (and displayed) at any point in time, with the displayed page being selected based upon selection of a corresponding tab. For example, in this illustration, tab 260(1) labeled 'requirement' has been selected and is active, and the page corresponding to the chat topic 'requirement' is displayed.

As messages are entered and displayed on page 230(1), older messages may scroll off of the selected page 230(1). Previously displayed messages may be retrieved using a scroll bar, both during an ongoing chat session and when accessing an archived version of a chat session. Messages on a selected page are displayed in chronological order, e.g., the order of message entry by each participant.

As discussed previously, chat window 210 may contain a plurality of tabs 260(1)-260(N) corresponding to a plurality of topics, which may be preset on chat window 210 prior to the beginning of the communication session or added after the chat session begins. Each of the tabs 260(1)-260(N) corresponds to a particular one of the pages 230(1)-230(N) associated with a single chat topic. That is, tab 260(1) corresponds to page 230(1), tab 260(2) corresponds to page 230(2) and so on. When tab 260(1) is the active tab, page 230(1) is displayed, when tab 260(2) is the active tab, page 230(2) is displayed, and so on. Each tab may be displayed in each chat window of each participant prior to the beginning of the instant message session. In some configurations, up to five tabs may be preset prior to the beginning of the conference session. Additionally, each tab may have an associated index (not shown), through which a moderator 120 may modify the name of the tab corresponding to a particular page.

In FIG. 2A, three tabs are shown: the first tab is labeled 'requirement' and corresponds to a page dedicated to a discussion topic related to requirements, the second tab is labeled 'schedule' and corresponds to another page related to the topic of 'schedule', and the third tab is labeled 'issues' and corresponds to a third page related to the topic of issues. By configuring the chat session such that every topic has a designated page, accessible by selecting a corresponding tab via 'select tab' command 265, messages can be easily and accurately categorized. Selecting an appropriate tab via 'select tab' command 265, activates the corresponding page, and subsequent text-based messages are associated and displayed on the selected page. This configuration allows each member of the discussion to know which topic is currently being discussed as well as which topics are planned to be discussed during the meeting. As discussed previously, the moderator (or a user) may freely click any of the non-selected tabs to view associated contents. Such activity will not trigger a change of topic, nor will such activity be propagated to other participants, unless the 'select tab' command is chosen.

Still referring to FIG. 2A, three participants (Moderator 1, User 1, and User 2) are discussing the topic named 'requirement.' The moderator selects the current topic by selecting the desired tab, e.g., tab 260(1) via 'select tab' command in the example of FIG. 2A. Upon selection of the desired tab, the corresponding page is displayed and all subsequent messages are presented in order of entry. In this example, the active tab 260(1) 'requirement' is highlighted/shaded, while tabs 260(2)-260(N) are inactive and are thus not highlighted/shaded as shown in FIG. 2A.

During the course of the chat/IM conversation, new topics may need to be added to the current discussion. Accordingly, selecting 'start new topic' command 280 allows a moderator or other authorized party/user to add one or more new topics prior to or during an online conversation. In the event that one or more topics need to be renamed, or are no longer relevant, command 282 may be used to delete one or more topics, while command 284 may be used to rename one or more topics. Topics may be closed via command 288, and topics may be searched using command 286.

Figure 2B:
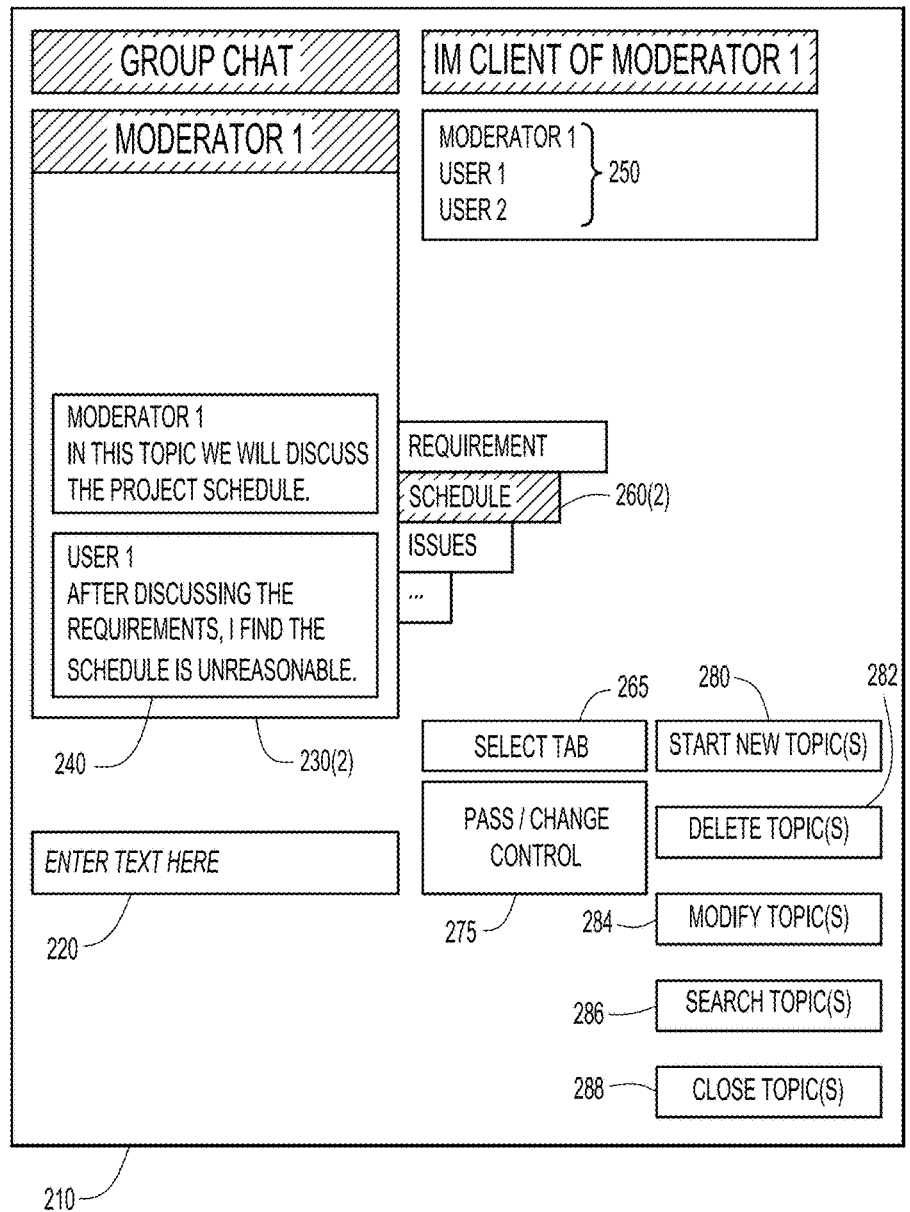
FIG. 2B is another illustration of an example of a chat window of a moderator, similar to FIG. 2A, and showing a topic change, according to the techniques disclosed herein.

As shown in FIG. 2B, if the moderator 110 of FIG. 1 wishes to change the discussion topic, or another attendee having administrative capabilities wishes to change the discussion topic, a tab may be selected using 'select tab' command 265 that corresponds to the desired topic. For example, FIG. 2B shows that tab 260(2), labeled 'schedule', has been selected via the 'select tab' command 265 and is active. Accordingly, the previous page 260(1) corresponding to requirements is now hidden and inactive (with all corresponding messages kept intact), and page 230(2) corresponding to the topic of 'schedule' is now displayed. Accordingly, messages that are subsequently entered by any participant will be categorized and displayed on the page corresponding to 'schedule.' Similarly, as described above, clicking on any of the tabs 260(1)-260(N) may be used to view previously entered comments corresponding to a desired topic. Only by clicking on a desired topic tab followed by entering a 'select' tab command, will a different page be selected and the new page propagated and synchronized with each user device of the online chat session.

By categorizing discussion topics in this manner, that is, utilizing a tab to select a page corresponding to a particular discussion topic, messages from participants are categorized according to a specified topic and associated with a corresponding page. Accordingly, meeting topics may be easily reviewed and archived, according to topic, allowing conversations to be easily retrieved and understood.

It is also understood that messages entered into the message input window are provided to server 120 as part of a message stanza. Message stanzas are communication protocols between a client and a server, containing XML text, and are described in additional detail below.

Figure 2C:
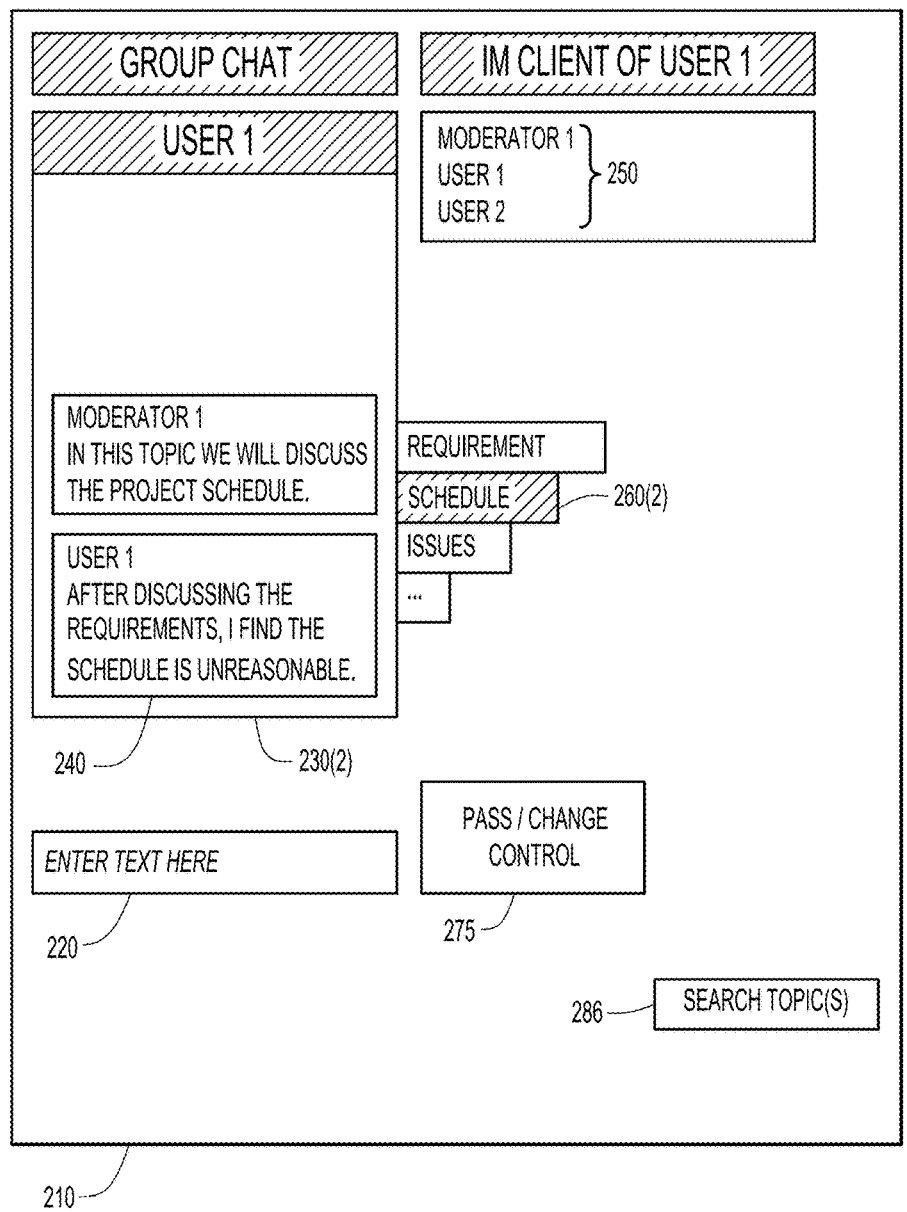
FIG. 2C is an illustration of an example of a chat window, similar to FIGS. 2A and 2B, but for a user not having administrative privileges, according to the techniques disclosed herein.

FIG. 2C shows an illustration of an example user interface screen for a chat window 210 that may be displayed on a device participating in a chat session, e.g., on any of the devices 120(1)-120(N) not having administrative privileges, according to the techniques disclosed herein. While a user has the ability to view each tab and corresponding page, and may click freely among displayed tabs to view associated contents, the user does not have the ability to select/activate a new page and propagate this change to all users of a chat session. Additionally, the user does not have the capability to submit a request to add a new topic/tab and create a corresponding page, nor modify, delete or close a previously created topic/tab.

Figure 2D:
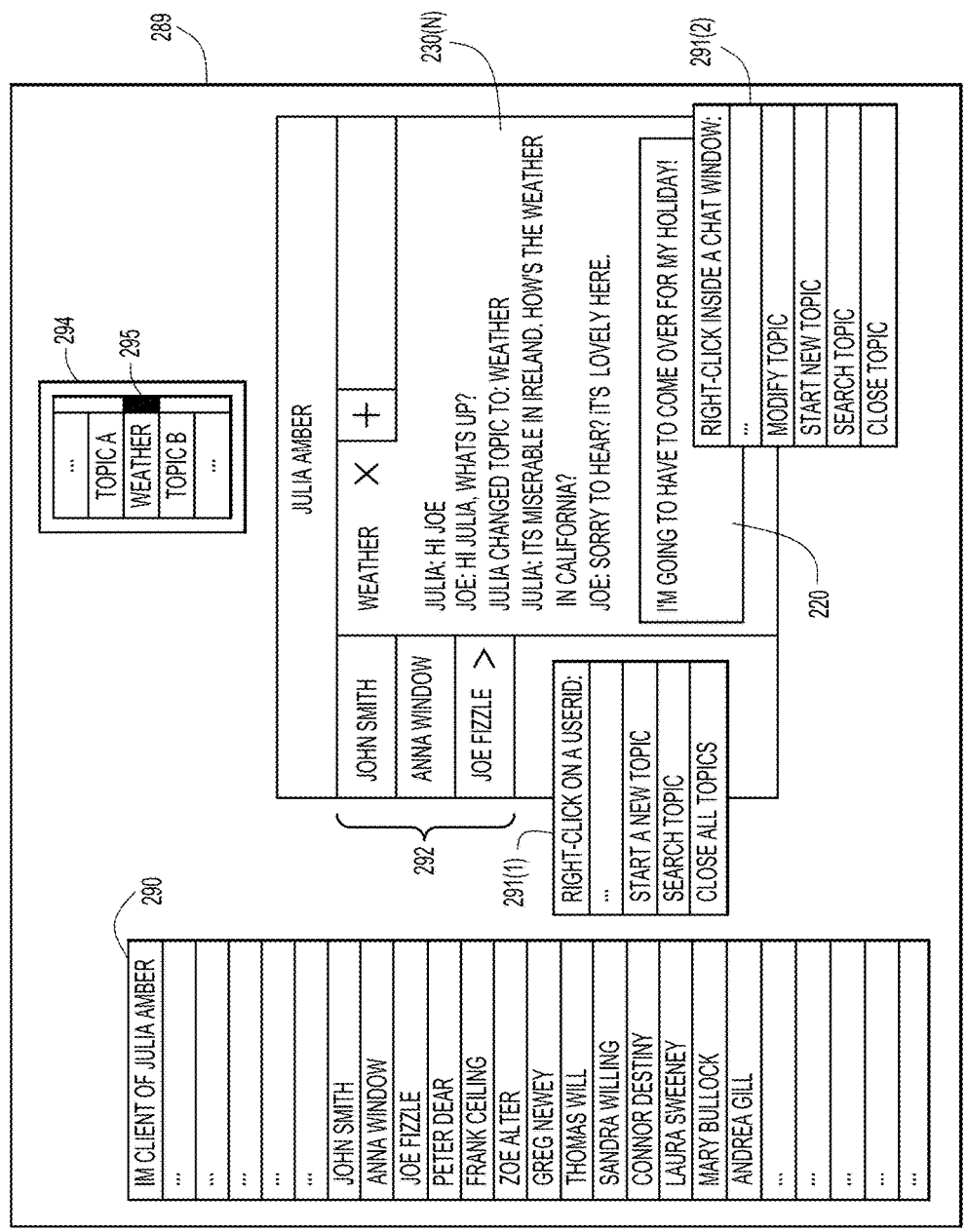
FIG. 2D is another illustration of an example of a chat window of a moderator, and showing a configuration to handle a large number of topics/pages, according to the techniques disclosed herein.

FIG. 2D shows still another example graphical display screen 289 according to the techniques disclosed herein. As discussed previously, the examples presented herein are not intended to be limiting with regard to a specific graphical user interface, and are merely provided for illustrative purposes. The techniques presented herein apply to a virtually unlimited number of participants. This figure displays a large user list of instant messaging contacts 290. If a subset of contacts is displayed, a scroll bar (not shown) may be used to view additional participants that are not currently shown in the display.

FIG. 2D also shows an example of a drop-down menu associated with various commands from right-clicking the display via a mouse (or though some other equivalent means). For example, two drop down menus 291(1) and 291(2), which represent an alternative to buttons, icons, or other means for performing commands, are accessed by right clicking a user identifier or inside a chat window. Participant list 292 shows one or more instant messaging contacts actively participating in a chat session. Again, a scroll bar may be provided to display users not currently shown on a display screen.

Still referring to FIG. 2D, the techniques presented herein also apply to an unlimited number of pages. In cases in which a large number of pages are present, a subset of pages may appear on the graphical display, as shown in topic list 294. Topics that are not displayed are accessible via scroll bar 295. Additionally, topics may be displayed within topic list 294 in a variety of configurations, including an alphabetical ordering, an order of creation, a frequency, or other customized order determined by a moderator. Message input area 220 and page 230(N) are the same as previously described.

Figure 3A:
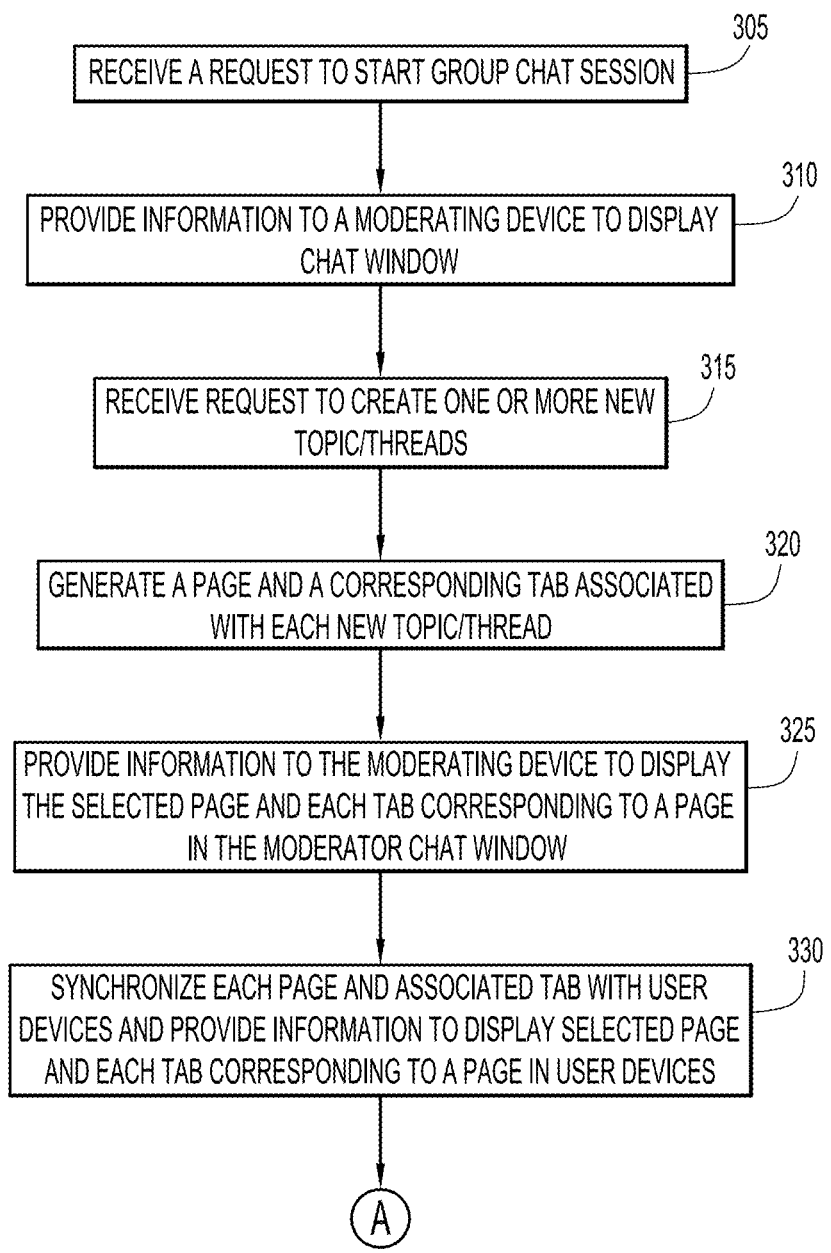
FIGS. 3A, 3B and 3C illustrate a flowchart of operations for creating and/or modifying a topic according to the techniques disclosed herein.
Figure 3B:
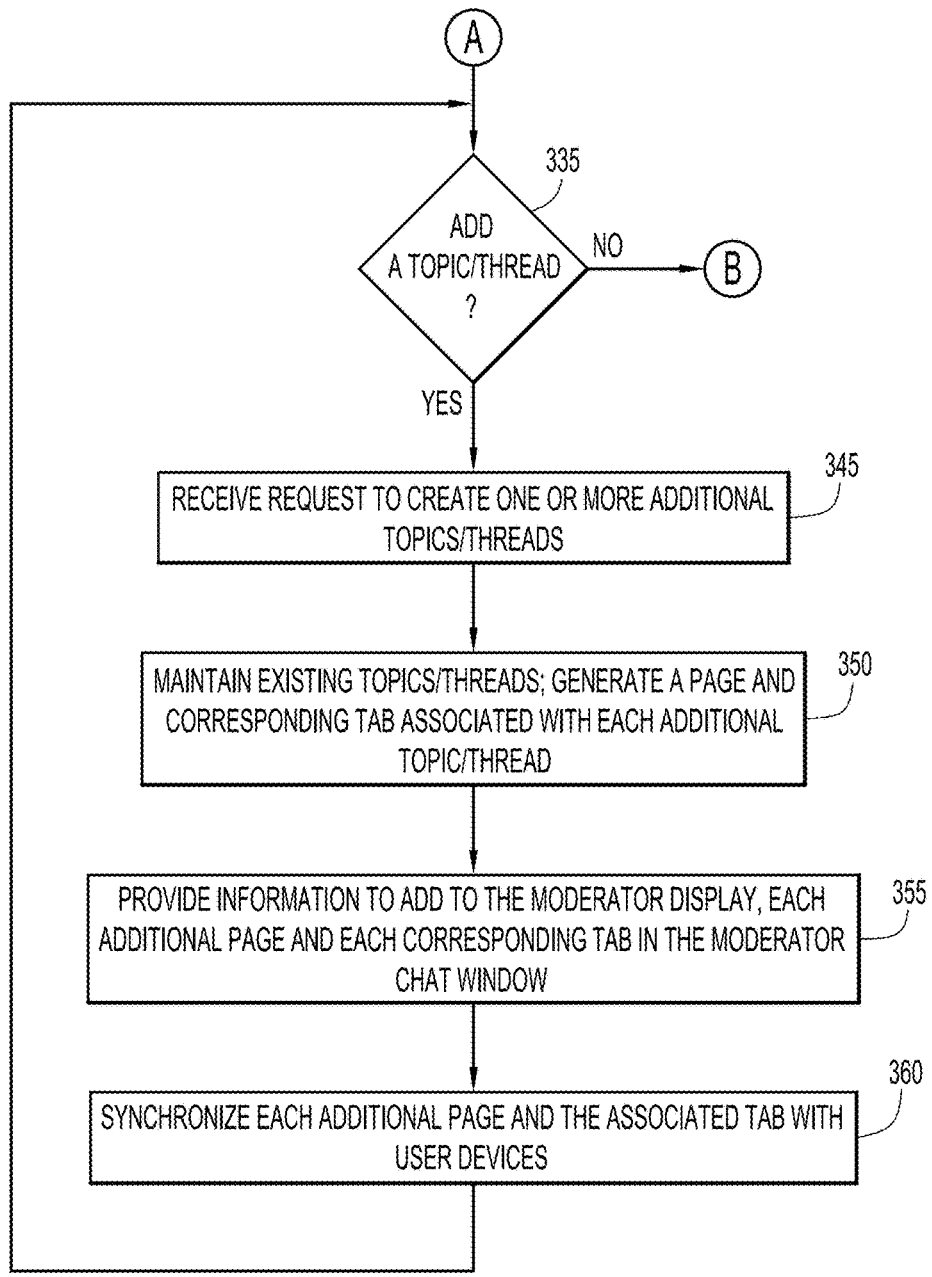
Figure 3C:
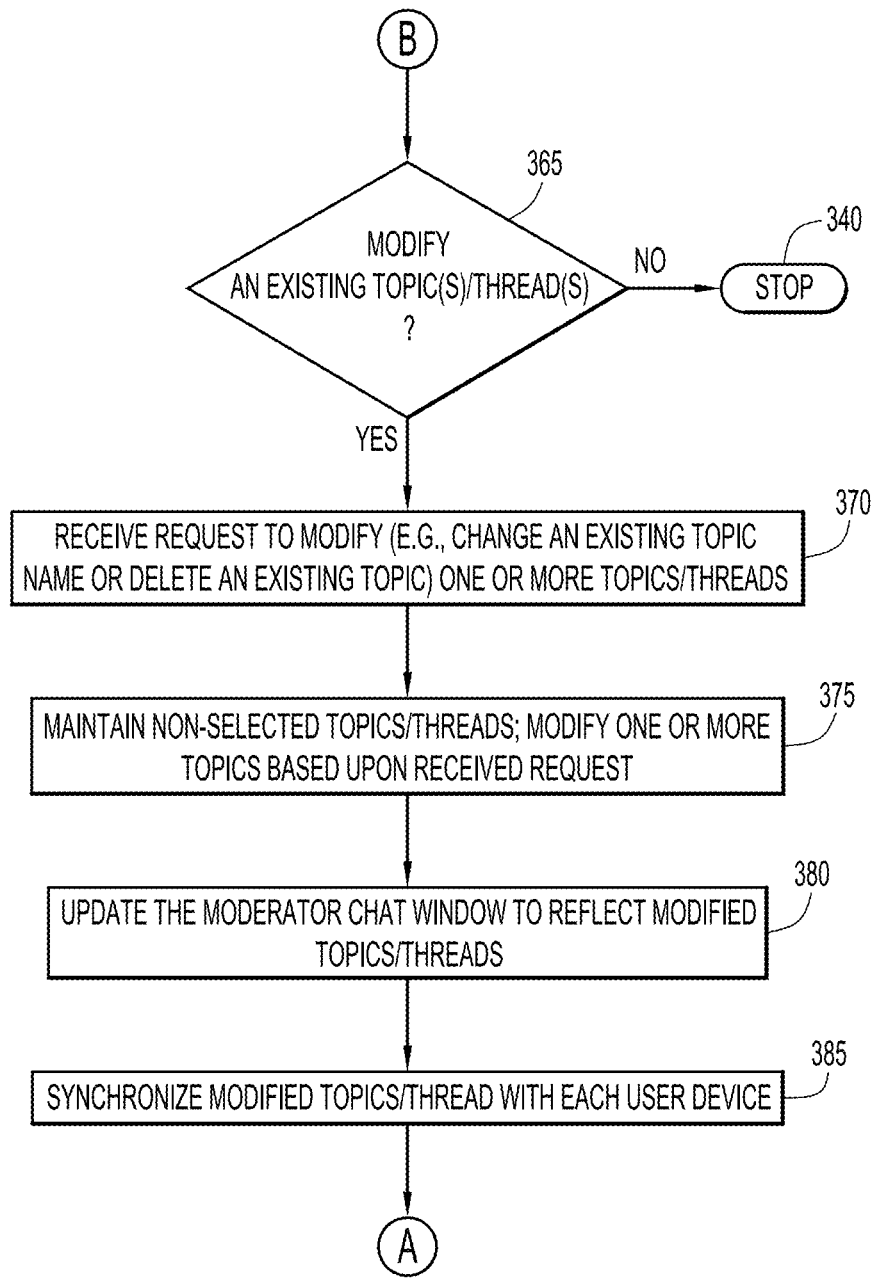

FIGS. 3A, 3B and 3C show a flowchart of operations performed to achieve the functionality described in conjunction with FIGS. 1, 2A-2D. At operation 305, a request is received from a participant, e.g., a moderator or other participant with moderator privileges, to start a group chat session. At operation 310, the request is processed, by a server (e.g., server 140 shown in FIG. 1), and information associated with the chat session is sent to the requesting/moderator device, enabling display of the chat session at the moderator device. At operation 315, a request is received to create one or more new topic(s)/thread(s) corresponding to a particular topic to be addressed during the chat session. The received request may be a request to create a single topic or may be a request to create multiple topics. Though not specifically shown as such, if no request is received at 315, the process proceeds to operation 335 in FIG. 3B.

If a request is received, then at operation 320, a page and a corresponding tab associated with each new topic is generated. At operation 325, information is provided to the moderator device to display a selected page along with each tab of a plurality of tabs (each tab corresponding to a page) in the chat window of the moderator. If no page has been selected, the first page created will be selected by default. At operation 330, each page and its associated tab is synchronized with the other participant devices (aside from the moderator device) of the chat session, enabling each of the other devices to display the selected page as well as each tab of the plurality of tabs.

At operation 335, input is generated by the moderator device as to whether an additional topic is requested. In some approaches, operation 335 is performed after the initiation of the chat session. In still other approaches, operation 335 is performed prior to the initiation of the chat session. In the event that no additional topics are requested, the creation process proceeds to operation 365 in FIG. 3C. In the event that additional topics are desired, the process continues. At operation 345, a request is received to create one or more additional topic(s)/thread(s). At operation 350, the existing topic(s)/thread(s) is/are maintained, and a new page and a corresponding tab are generated. At operation 355, information is sent to the moderator device to enable the chat window of the moderator to be updated to display the newly added page and the corresponding tab, in addition to the one or more previously created pages and corresponding tabs. At operation 360, each participant device (other than the moderator device) is synchronized such that the additional page and corresponding tab are displayed on each participant device. The process loops back to operation 335, at which point another additional topic may be added or the process continues to operation 365.

At operation 365, input is generated by the moderator device as to whether modifying (including deleting a topic) an existing topic has been requested. In the event that no modifications are requested, the creation process concludes at operation 340. In the event that a modification is desired, the process continues. At operation 370, a request is received to modify (e.g., change an existing topic name or delete an existing topic) one or more topic(s)/thread(s). At operation 375, the non-selected topic(s)/thread(s) is/are maintained, and modifications to the one or more selected topic(s)/thread (s) are made. At operation 380, information is sent to the moderator device to enable the chat window of the moderator to be updated to display the modified topic name and/or remove the deleted tab and corresponding page from display, while maintaining one or more previously created pages and corresponding tabs. At operation 385, each user device is synchronized such that the modifications are displayed on each participant device. The process loops back to operation 335 in FIG. 3B, at which point another additional topic may be added or the process may be terminated at operation 340. It is understood that the flow charts of FIGS. 3A-3C are not intended to be limiting, and other arrangements of the operations fall within the scope of the techniques presented herein. For example, FIG. 3B may be, in some approaches, a separate process from FIG. 3C. In other approaches, such as those shown herein, the two processes are operationally connected.

Figure 4:
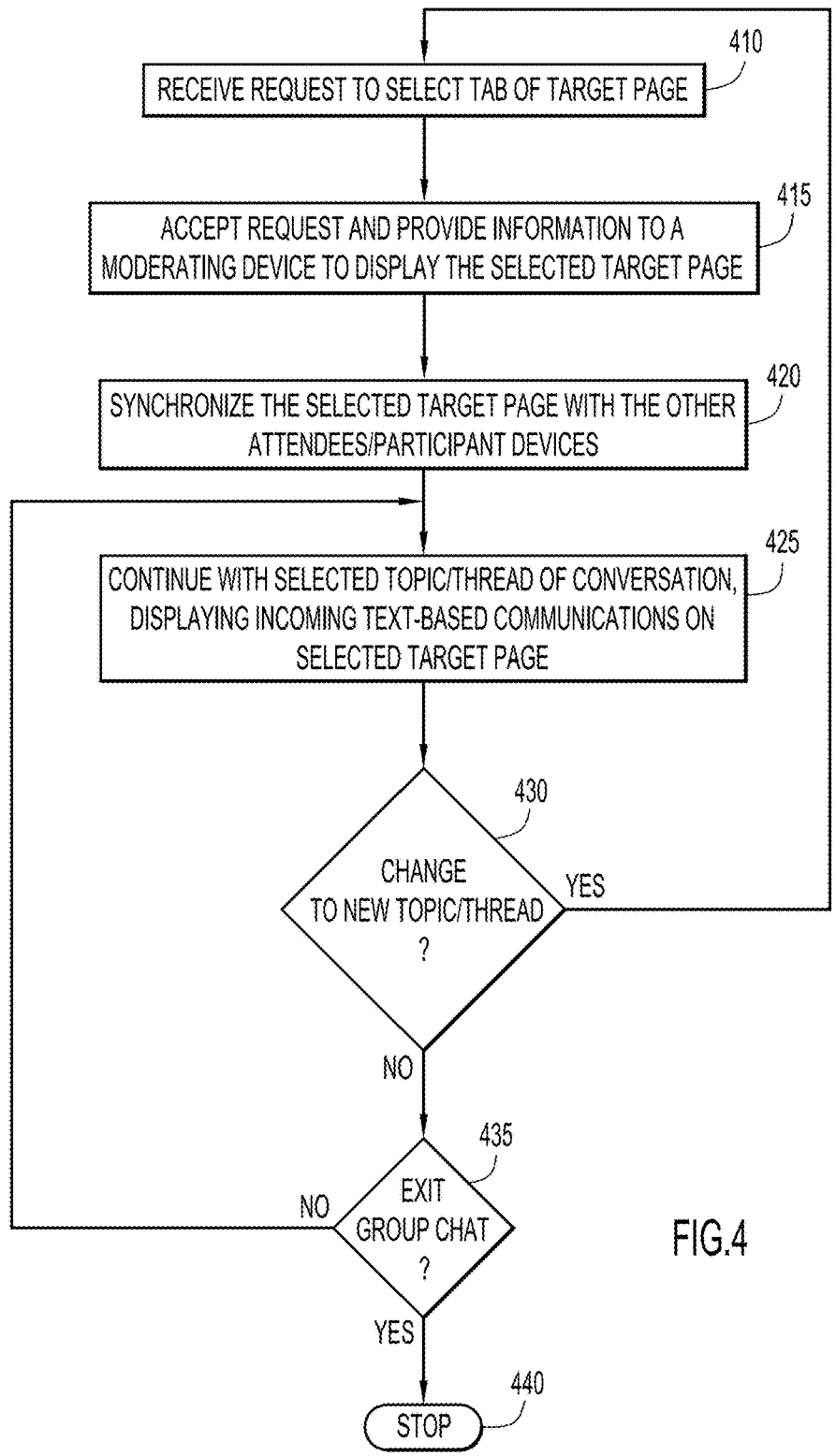
FIG. 4 is a flowchart depicting operations for changing from one topic to another, during an ongoing conversation, according to the techniques disclosed herein.

Reference is now made to FIG. 4. FIG. 4 shows a flowchart for operations involved in selecting a new topic after the initiation of an online chat session. At operation 410, an input is received from a moderator device or other device wherein a user has moderating privileges, the input indicating a request to select/activate a tab of a target/desired page. At operation 415, the request to change to a different topic tab via the 'select tab' command is accepted and information is provided to a moderator device to display the selected target page in its chat window. At operation 420, the selected target page is synchronized with the other participant devices, enabling each of the other participant devices to display the page corresponding to the selected tab. At operation 425, the conversation continues with the selected topic/thread, with input from all devices (moderator and other users) displayed on the selected page. At operation 430, the process may be repeated if a request is received from a moderator to switch to a new page. In the event another page is selected, operations 410-425 will be repeated. In the event that a new topic change has not been requested, then the process continues to operation 435. Operation 435 determines whether a request has been received from any device to exit the group chat session. If a request is received from the moderator (and there are no other attendees with moderating privileges) to end the group chat session, the entire chat session is ended at operation 440. If a request has not been received, then the session continues as in operation 425. In the event that a user wishes to exit the chat session and a moderator or participant with moderator privileges is still present, the user is allowed to exit the chat session without terminating the overall group chat session.

Figure 5A:
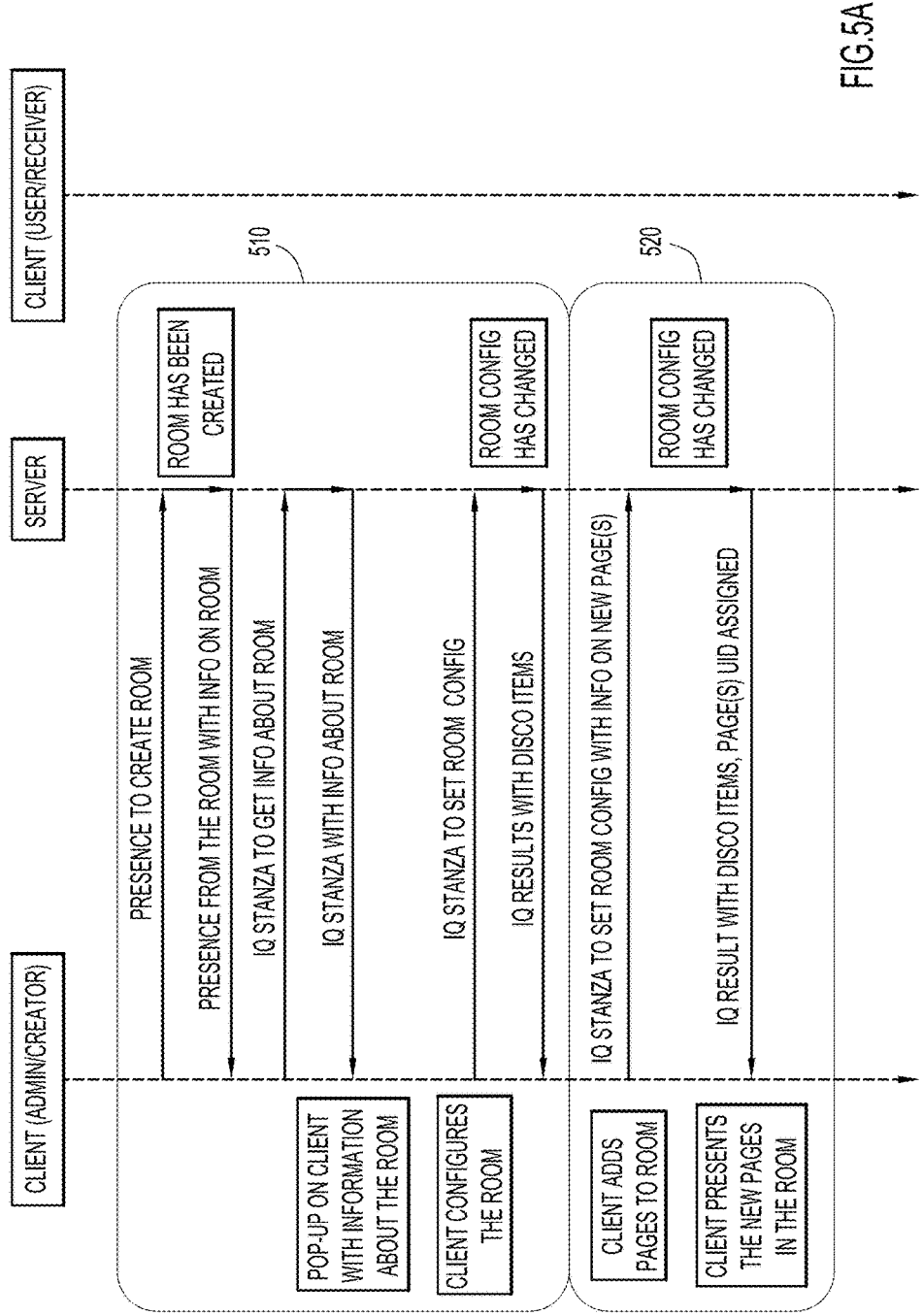
FIGS. 5A, 5B and 5C illustrate a ladder diagram depicting operations between a server and a plurality of clients/devices for a specific example of an implementation for generating and changing topics during an ongoing meeting, according to the techniques disclosed herein.
Figure 5B:
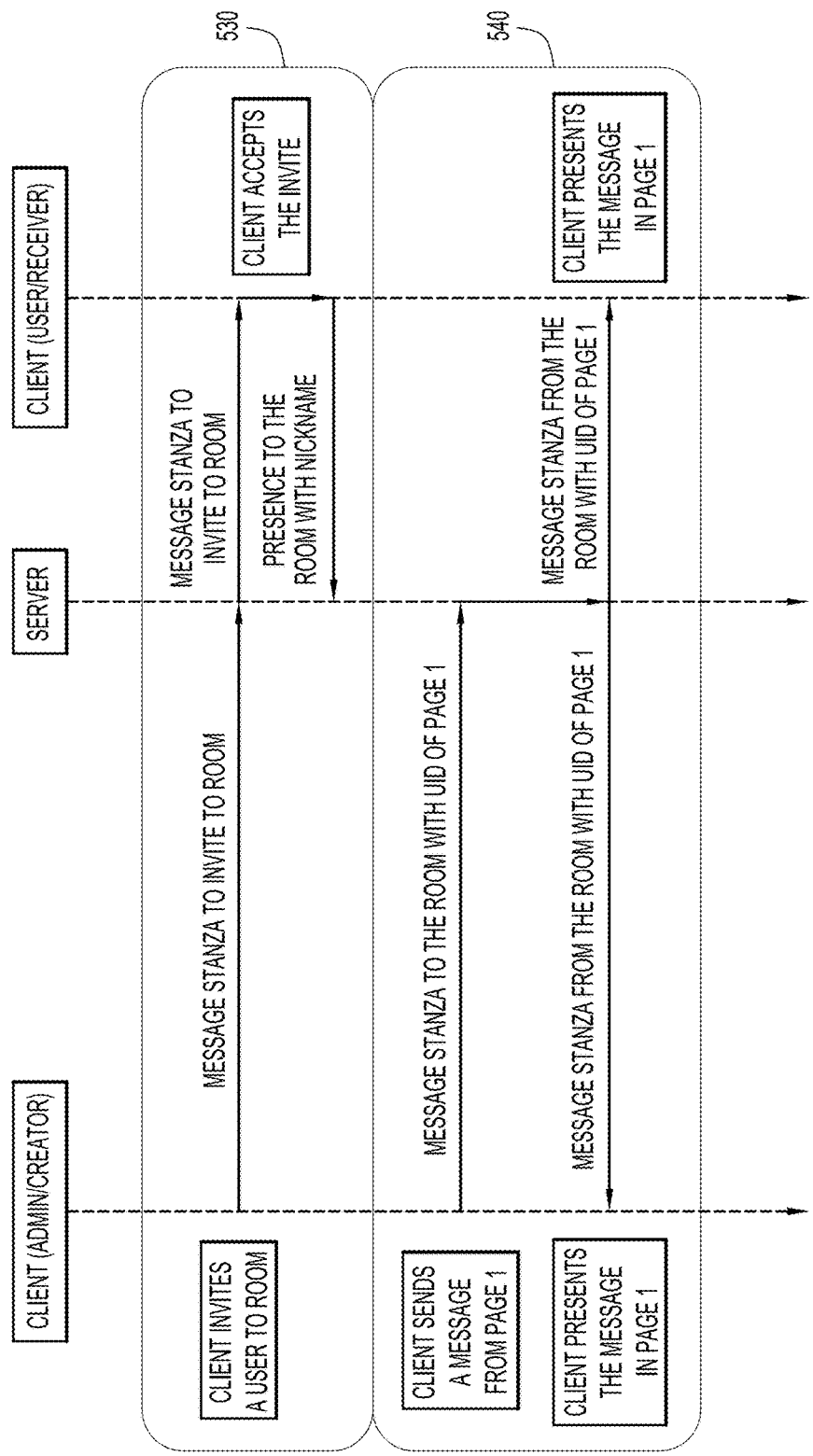
Figure 5C:
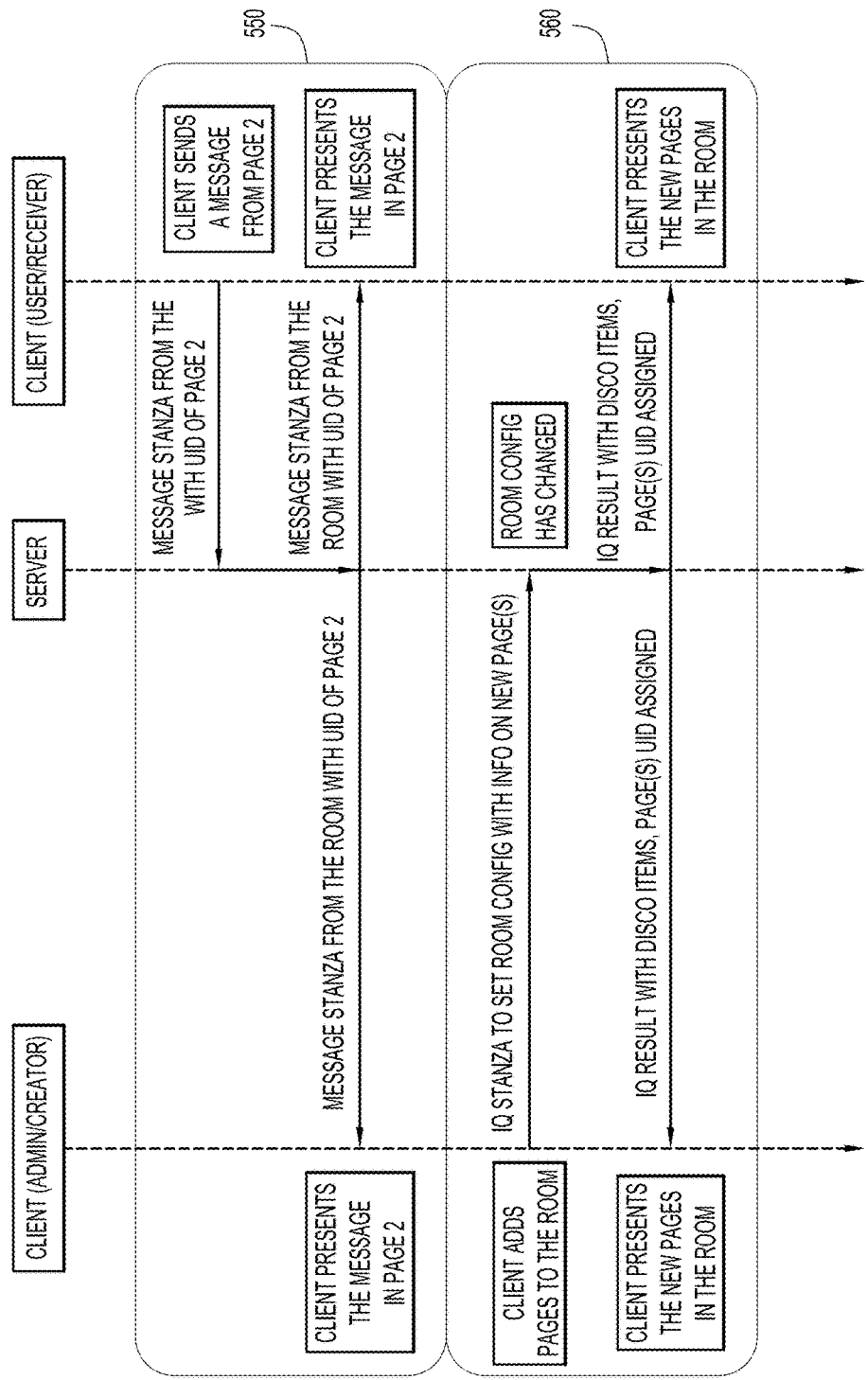

FIGS. 5A, 5B and 5C illustrate a more detailed flowchart of operations between a client with administrative privileges, a server and a client with user privileges according to the techniques disclosed herein. This flowchart is based upon eXtensible Messaging and Presence Protocol (XMPP) technology, a set of open technologies for instant messaging, presence, multi-party chat, voice and video calls, collaboration and generalized routing of eXtensible Markup Language (XML) data. Specific aspects of FIGS. 5B and 5C, e.g., aspects relating to message stanzas, will be discussed in additional detail below.

As background, XMPP provides different types of stanzas for different types of delivery semantics. For example, message stanzas typically are one-directional communications sent to a single recipient; presence stanzas typically are one-directional communications sent to multiple recipients; and iq stanzas are information request queries.

The following description is for a more specific implementation of the techniques disclosed herein, using XEP-0045, also known as Multi-User Chat (MUC) standard. Existing MUC elements do not presently offer sufficient flexibility to accommodate the techniques disclosed herein. For example, the current MUC standard does not contain any elements allowing message stanzas belonging to the same chat room, i.e., having the same value specified by the <subject> element, to be further divided into sub-categories. Thus, in one approach, the techniques disclosed herein provide for an extension to current MUC standards, wherein a new element may become part of a message stanza flowing to and from the chat room, between a moderator and other participants.

FIG. 5A shows a series of communications between a client and a server to establish a chat room, through the use of specific XMPP commands. At operation 510, an IM client (e.g., a moderator device 110) communicates with a server to set up the infrastructure of a chat room, e.g., creating and configuring a chat room. At operation 520, an IM client (e.g., a moderator device 110) may add pages to a chat room using a new element , which is associated with a mandatory attribute such as a unique identifier. The IM client visualizes/displays one page at a time—the selected page. As an example, a unique identifier, e.g., a uid, may be inserted into the active page element's id attribute of the message stanza.

A message stanza may be utilized, according to the techniques presented herein, to communicate with a server to set up a page corresponding to each desired topic, wherein a unique identifier is associated with each page. Servers may also communicate with clients via message stanzas. For example, a message stanza may be sent to the chat room server from the moderator as shown in operation 520. Message stanzas may include a destination 'To', an origin 'From', e.g., the name of a local server, the 'type' of chatting session, as well as a session identifier 'id'. An example of a message stanza that may be used to establish multiple pages is provided below. Although this example shows multiple pages being set up in a single message stanza, it is expressly understood that messages stanzas may be configured to set up one page at a time.

```
<message
    from='wiccarocks@Shakespeare.lit/laptop'
    id='uj3bs61g'
    to='coven@chat.Shakespeare.lit'
    type='groupchat'
    '>Requirements
    '>Schedule
    '>Issues
</message>
```

Upon completion of operation 520, the process may proceed to operation 530 in FIG. 5B.

Referring to FIG. 5B, once all desired pages are established, the moderator may then send invitations to each participant, as shown in operation 530. Upon joining the chat room, each participant is able to view the roster (list of attendees), room subject(s) and room page(s), as well as the  element as part of a presence stanza.

At operation 540, a moderator sends a message stanza containing a unique identifier, e.g., a uid corresponding to selected page 1, to a server. The server then sends, to each participant, a message stanza containing the unique identifier corresponding to page 1 and associated message, thereby allowing the message to be presented on selected page 1 of each participating device (e.g., moderator and user devices). Thus, the techniques presented herein ensure that messages are logically categorized by page, by inserting a corresponding uid of a selected page into a message.

When the moderator changes the page (not shown in FIGS. 5A-5C), a message stanza is sent to the server with the desired page name and corresponding uid. A message stanza with the selected page is then subsequently sent from the room to all participants so that all participants will visualize the same page. Similarly, if the moderator adds a new page, a message stanza with a new page element and new uid corresponding to the new page element is sent to the server, which forwards this information to each of the participants. Upon completion of operation 540, the process may proceed to operation 550 in FIG. 5C.

Referring to FIG. 5C, operation 550 shows an example, in which page 2 has previously been selected, of a user sending a message stanza to a server containing a message and a unique identifier of the selected page, e.g., the uid of page 2. The server then sends a message stanza to each participating device with the unique identifier of the selected page and associated message. Thus, the message from the user will be displayed on page 2 of each participating device.

Accordingly, every message sent to and from the server by each participant contains the  element along with the corresponding uid. In some aspects, when a participant writes a message to the chat room, the page uid is determined by the selected page, and inserted into the message to determine the page the message will be written to. This ensures a categorization of the messages into their logical groups in addition to organization by chronological order of entry.

Operation 560 shows an example of an iq stanza being sent to a server to add additional pages to a chat session. Once a new page has been created by the server, the server sends an iq result to each participating device, which contains the unique identifier corresponding to the new page.

In some aspects, the client device may determine the unique identifier, e.g., the uid, and provide this information to the server as part of the request to set up a new room. In other aspects, the server may determine the uid.

As mentioned previously, a chat room is configured such that changing the subject of a room is limited to users having a role of moderator. Under the MUC standard, privileges may be extended by the 'muc#roomconfig_changesubject' option. Thus, this setting may be configured to extend permissions to change room topics to participants other than moderators.

Figure 6:
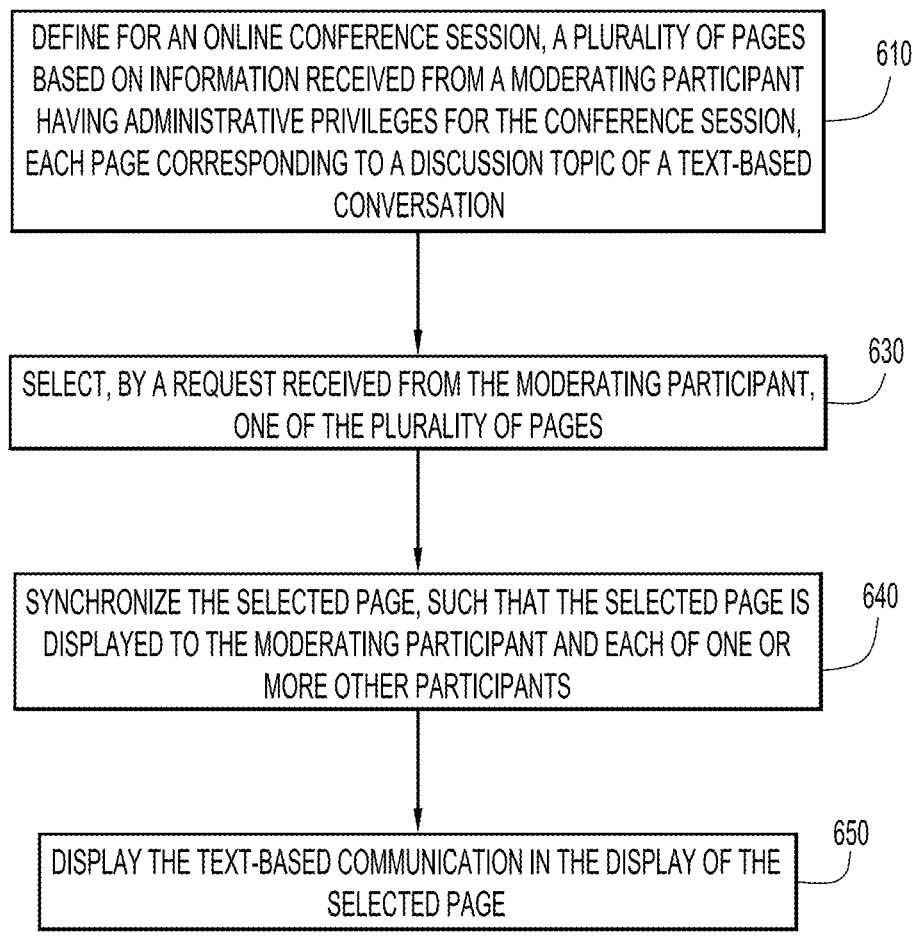
FIG. 6 is a flowchart generally depicting operations according to the techniques disclosed herein.

FIG. 6 shows a high-level/generalized flowchart of operations performed by server 140 according to the techniques described herein. At operation 610, for an online conference session, a plurality of pages, which may be preconfigured, are defined for the conference session based on information received from a moderating participant having administrative privileges, with each page corresponding to a discussion topic of a text-based conversation. At 610, data is stored that represents the plurality of defined pages. At operation 630, a request received from the moderating participant is used to select one of the plurality of pages. At operation 640, the selected page is synchronized with other participant devices such that the selected page is displayed to the moderating participant and each of the other participants. At operation 650, the text-based communication is displayed in the display of the selected page. Additionally, one or more other participants may be invited to join the conference session at any time with respect to any of the above operations. As explained above, operations 610-650 may be performed continuously/repeatedly over time to display new messages on the selected page.

Figure 7:
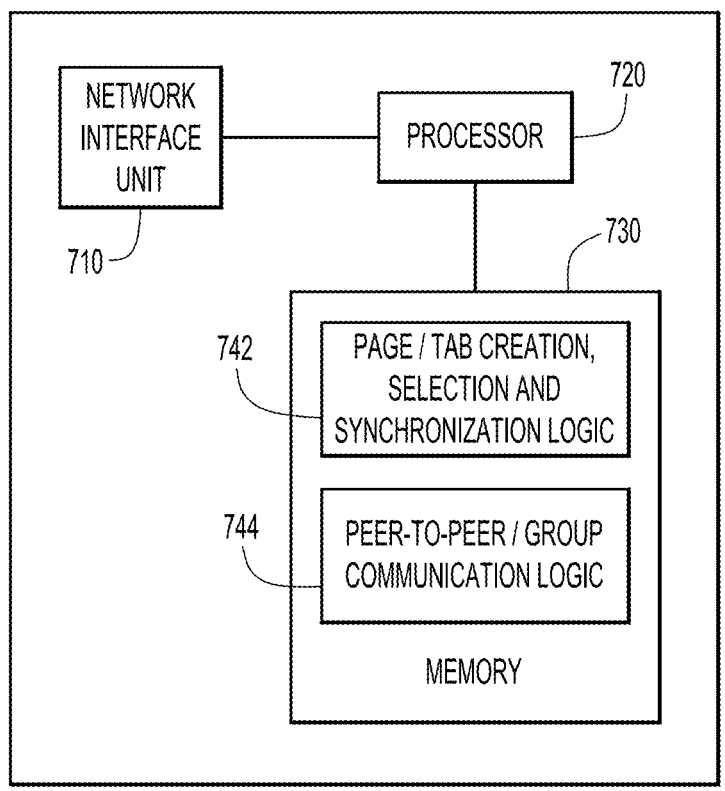
FIG. 7 is an example block diagram of a device (e.g., a server) configured to host a multi-user chat session according to the techniques disclosed herein.

FIG. 7 illustrates an example block diagram of an apparatus 700 (e.g., server 140) configured to perform the techniques presented herein. The apparatus 700 includes a network interface unit 710, a processor 720, and a memory 730. The network interface unit 710 is configured to enable network communications over a network. While conceptually illustrated as a 'network interface unit,' it will be appreciated that a physical device may contain more than one network interface or type of interface to communicate with other devices within a network. For example, network interface unit 710 may comprise a wireless transceiver to facilitate wireless communication.

The processor 720 may be embodied by one or more microprocessors or microcontrollers, and executes software instructions stored in memory 730 for page/tab creation, selection and synchronization (including commands 265, 280, 282, 284, 286 and 288) logic 742 and peer-to-peer/group communication logic 744 in accordance with the techniques presented herein in connection with FIGS. 1-6.

Memory 730 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 730 may comprise one or more tangible (e.g., non-transitory) computer readable storage media (e.g., a memory device) encoded with software comprising computer executable instructions, and when the software is executed by the processor 720, the processor 720 is operable to perform the operations described herein in connection with selection and synchronization logic 742 and peer-to-peer/group communication logic 744. In other approaches, selection and synchronization logic 742 and peer-to-peer/group communication logic 744 are stored remotely, external to apparatus 700, but accessible by processor 720.

The functions of the processor 720 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 7 shows that the server 140 may be embodied as a dedicated physical device, it should be understand that the functions of the server 140 may be embodied as software running in a data center/cloud computing system, together with numerous other software applications.

As explained above, the need for separating a conversation into threads does not only exist in discussions having multiple members. In peer-to-peer discussions, e.g., involving two participants, conversations may also jump from one topic to another topic. The conversations can be lengthy as well. Thus, the techniques presented herein also apply to a peer-to-peer discussion. For example, in a peer-to-peer environment, one of the peers would initiate the conversation and manage the categorization of messages just like in a multi-user meeting environment. Additionally, one of the peers/participants could provide privileges to the other participant device to be able to change topics, as in the preceding examples. Similar to the preceding discussion, the IM client honors the uid of the pages and visualizes each page separately. The corresponding uid will be inserted into the active page element's id attribute of the message stanza. This will ensure that the messages flowing between the two users can be logically categorized by topic/page and not in one window chronologically.

The techniques presented herein provide a computer-implemented method of synchronizing a chat session between multiple users, such that all messages will appear on a page corresponding to a selected tab. As discussed herein, participants have the ability to view content on non-active pages. However, in other approaches, all meeting attendees may be required to view the same page at the same time. Each page has a distinct core conversation topic to facilitate the coordinated discussion of meeting topics and promote productivity. Once the meeting is finished, the moderator can easily summarize and save the chat session in a manner that allows each page to be associated with content only on its page. Thus, conversations from meetings and associated content may be stored for later analysis and retrieval.

The techniques presented herein may be used to prevent a user from freely changing topics. In order for a different page to be selected during a chat meeting, such a request is provided by a moderator or other user having appropriate privileges to the server hosting the chat session. By preventing users from being able to freely change topics within a meeting session, the discussion can remain coordinated and ordered, as all participants are viewing the same page. Moreover, only one topic may be selected by a moderator at any given point in time, providing temporal control over the meeting. Topics that are not selected are disabled.

Additionally, the techniques presented herein have advantages over other methods of setting up multi-topic meetings, such as setting up a different chat room for each meeting topic. In this approach, there would be no centralized control, and each end user could enter comments into each chat room at any given time during the chat session, bringing disorder to the meeting. Using the techniques presented herein, when a moderator selects a specific page, all chatting participants are driven to the selected page, which facilitates meeting management and promotes a focused discussion by ensuring that all messages are displayed on the selected page. Additionally, a moderator may return to the previously selected page, with the history of the chat session safely kept and maintained, allowing participants to resume previously discussed topics.

Furthermore, a single invitation to the chat session provides access for a participant to each topic—multiple invitations are not required. Thus, the same attendees in the same chat room may discuss different topics in a coordinated manner to improve group discussion efficiency.

Additionally, the techniques presented herein provide a system that receives input from a client to allow client-driven customization of topic categorizations. As the topic list may be generated at the start of every session, there is essentially no limit to the types of categories that can be created. In other words, with this configuration, it is not required that a limited set of topic names be preconfigured and stored in a database for subsequent access. Instead, such information is fully customizable.

Additional advantages of the techniques disclosed herein stem from having a centralized moderator controlling the session. For instance, if two topics are distinct, but closely related, such as 'Schedule for Team in India' or 'Schedule for Team in United States,' distinguishing whether subsequent references to 'Schedule' refer to the team in India or the team in the United States could be challenging, whether by a participant reviewing a transcript of the session or by an automated classification process during the session. By configuring the chat session such that a single topic, selected by the moderator, is chosen at any given point in time, and associated with all subsequent messages, any ambiguity in topic selection is eliminated.

The above description is intended by way of example only. Various modifications and structural changes may be made therein without departing from the scope of the concepts described herein and within the scope and range of equivalents of the claims.

What is claimed is:

1. A computer-implemented method comprising:
   defining, for an online conference session, a plurality of pages based on information received from a moderating participant having administrative privileges for the conference session, each page corresponding to a discussion topic of a text-based communication;
   selecting, by a request received from the moderating participant, one of the plurality of pages;
   synchronizing the selected page, such that the selected page is displayed to the moderating participant and each of one or more other participants in the online conference session;
   after selecting one of the plurality of pages, chronologically displaying, in the display of the selected page, an entirety of the text-based communication that is generated while the selected page remains selected until another page of the plurality of pages is selected; and receiving, from the moderating participant, commands to manage the online conference session, the commands including a command to add a new page corresponding to a new discussion topic, a command to delete at least one page of the plurality of pages, a command to modify the selected page, a command to search for a specific page of the plurality of pages, and a command to close the selected page.

2. The computer-implemented method of claim 1, further comprising selecting by the moderating participant the another page of the plurality of pages.

3. The computer-implemented method of claim 2, further comprising assigning a subsequent text-based communication by the moderating participant or the other participants on the another page and displaying the subsequent text-based communication in the display of the another page.

4. The computer-implemented method of claim 1, wherein defining further comprises defining, for each page, a corresponding tab, and displaying each corresponding tab in a display window of the moderating participant and each of the one or more other participants.

5. The computer-implemented method of claim 1, further comprising displaying a new tab corresponding to the new page in a display window of the moderating participant and each of the one or more other participants, and wherein each previously displayed text-based communication associated with respective ones of the discussion topics is maintained on each corresponding page.

6. The computer-implemented method of claim 1, further comprising archiving text-based communications displayed on each page of the plurality of pages separately from each other.

7. The computer-implemented method of claim 1, wherein defining further comprises defining the plurality of pages prior to a beginning of the online conference session.

8. The computer-implemented method of claim 1, further comprising synchronizing the new page such that the new page is displayed to the moderating participant and each of the one or more other participants in the online conference session.

9. The computer-implemented method of claim 1, further comprising synchronizing the modified page, such that the modified page is displayed to the moderating participant and each of the one or more other participants in the online conference session.

10. The computer-implemented method of claim 1, wherein the command to modify the selected page includes a command to change a name of the discussion topic of the selected page.

11. An apparatus comprising:
a network interface unit configured to enable communications over a network; and
a processor coupled to the network interface unit, and configured to:
define, for an online conference session, a plurality of pages based on information received from a moderating participant having administrative privileges for the conference session, each page corresponding to a discussion topic of a text-based communication;
select, based upon information received from a request from the moderating participant, one of the plurality of pages;
synchronize the selected page, such that the selected page is displayed to the moderating participant and each of one or more other participants in the online conference session;

after selecting one of the plurality of pages, chronologically display, in the display of the, selected page, an entirety of the text-based communication that is generated while the selected page remains selected until another page of the plurality of pages is selected; and
receive, from the moderating participant, commands to manage the online conference session, the commands including a command to add a new page corresponding to a new discussion topic, a command to delete at least one page of the plurality of pages, a command to modify the selected page, a command to search for a specific page of the plurality of pages, and a command to close the selected page.

12. The apparatus of claim 11, wherein the processor is further configured to:
receive a request from the moderating participant, the request selecting the another page of the plurality of pages;
assign a subsequent text-based communication by the moderating participant or the other participants to the another page; and
display the subsequent text-based communication in the display of the another page.

13. The apparatus of claim 11, wherein the processor is further configured to define, for each page, a corresponding tab, and display each corresponding tab in a display window of the moderating participant and each of the one or more other participants.

14. The apparatus of claim 11, wherein the processor is further configured to display a new tab corresponding to a new page in a display window of the moderating participant and each of the one or more other participants, and wherein each previously displayed text-based communication associated with respective ones of the discussion topics is maintained on each corresponding page.

15. The apparatus of claim 11, wherein the command to modify the selected page includes a command to change a name of the discussion topic of the selected page.

16. The apparatus of claim 11, wherein the processor is further configured to archive text-based communications displayed on each page of the plurality of pages separately from each other.

17. One or more computer-readable storage media encoded with software comprising computer executable instructions that, when executed, are operable to:
define, for an online conference session, a plurality of pages based on information received from a moderating participant having administrative privileges for the conference session, each page corresponding to a discussion topic of a text-based communication;
select, based upon a request received from the moderating participant, one of the plurality of pages;
synchronize the selected page, such that the selected page is displayed to the moderating participant and each of one or more other participants in the online conference session;
after selecting one of the plurality of pages, chronologically display, in the display of the selected page, the entirety of the text-based communication that is generated while the selected page remains selected until another page of the plurality of pages is selected; and
receive, from the moderating participant, commands to manage the online conference session, the commands including a command to add a new page corresponding to a new discussion topic, a command to delete at least one page of the plurality of pages, a command to modify the selected page, a command to search for a specific page of the plurality of pages, and a command to close the selected page.

18. The computer-readable storage media of claim 17, further comprising instructions operable to:
   select the another page of the plurality of pages based upon a request from the moderating participant;
   assign a subsequent text-based communication by the moderating participant or the other participants to the another page; and
   display the subsequent text-based communication in the display of the another page.

19. The computer-readable storage media of claim 17, further comprising instructions operable to define, for each page, a corresponding tab, and display each corresponding tab in a display window of the moderating participant and each of the one or more other participants.

20. The computer-readable storage media of claim 17, further comprising instructions operable to display a new tab corresponding to the new page in a display window of the moderating participant and each of the one or more other participants, wherein each previously displayed text-based communication associated with respective ones of the discussion topics is maintained on each corresponding page.

21. The computer-readable storage media of claim 17, wherein the command to modify the selected page includes a command to change a name of the discussion topic of the selected page.

* * * * *

UNITED STATES PATENT AND TRADEMARK OFFICE
CERTIFICATE OF CORRECTION

| | | |
|---|---|---|
| PATENT NO. | : 10,116,599 B2 | Page 1 of 1 |
| APPLICATION NO. | : 14/153645 | |
| DATED | : October 30, 2018 | |
| INVENTOR(S) | : Wu et al. | |

It is certified that error appears in the above-identified patent and that said Letters Patent is hereby corrected as shown below:

In the Claims

Claim 11, Column 14, Line 2, please replace "display of the, selected page" with --display of the selected page--

Signed and Sealed this
Twelfth Day of February, 2019

Andrei Iancu
*Director of the United States Patent and Trademark Office*